United States Patent [19]

Tom

[11] Patent Number: 4,683,496
[45] Date of Patent: Jul. 28, 1987

[54] SYSTEM FOR AND METHOD OF ENHANCING IMAGES USING MULTIBAND INFORMATION

[75] Inventor: Victor T. Tom, Bedford, Mass.

[73] Assignee: The Analytic Sciences Corporation, Reading, Mass.

[21] Appl. No.: 768,957

[22] Filed: Aug. 23, 1985

[51] Int. Cl.[4] .......................... H04N 5/14; G06K 9/40
[52] U.S. Cl. ..................................... 358/166; 358/37; 382/49; 382/54
[58] Field of Search ................... 358/37, 166; 382/49, 382/54

[56] References Cited

U.S. PATENT DOCUMENTS 4,517,599  5/1985  Zwirn et al. ..................... 358/166
4,532,548  7/1985  Zwirn ................................. 382/54

OTHER PUBLICATIONS

"Adaptive Least-Squares Technique for Multi-Band Image Enhancement", IEEE International Conference on Acoustics, Speech, and Signal Processing, Mar. 1985, by Tom et al.; pp. 18.14.1–18.14.4.

"Spatial Resolution Improvement of TM Thermal Band Data", SPIE, vol. 504, Applications of Digital Image Processing VII (1984); by Tom et al.; pp. 384–390.

"Spatial Sharpening of TM Data using a Multi-Band Approach"; The Analytic Sciences Corporation; Optical Engineering, Nov. 1985, by Tom et al.

"Spatial Enhancement Techniques for Multichannel Satellite Imagery"; Proceedings IGARSS, by Tom et al.; Oct. 1985.

"Recursive Least Squares Smoothing of Noise in Images"; IEEE Transactions on Acoustics, Speech, and Signal Processing; vol. ASSP-25, No. 6; by Panda et al.; Dec. 1977, pp. 520–524.

"Synthetic Stereo and LANDSAT Pictures"; Photogrammetric Engineering and Remote Sensing, vol. 42, No. 10, by Batson et al.; Oct. 1976, pp. 1279–1284.

Primary Examiner—James J. Groody
Assistant Examiner—Michael D. Parker
Attorney, Agent, or Firm—Schiller, Pandiscio & Kusmer

[57] ABSTRACT

A system and method enhances a first pictorial representation of an image within a first frequency band so as to provide an enhanced pictorial representation of the image. The system and method uses information contained within at least one other registered pictorial representation of the image within a second frequency band and having a better resolution than the first pictorial representation of the image. In accordance with the operation of the system and carrying out the steps of method of the present invention, the other pictorial representation is modified, preferably by effectively blurring the representation to the resolution of the first pictorial representation such that local correlation information between the resulting modified pictorial representation and the first pictorial representation are determined and used to generate the enhanced version of the first pictorial representation.

19 Claims, 6 Drawing Figures

SYSTEM FOR AND METHOD OF ENHANCING IMAGES USING MULTIBAND INFORMATION

The present invention relates generally to the image enhancement of pictorial representations having relatively poor resolution and, more particularly, to a system for and method of enhancing the resolution of a pictorial representation of an image within a first frequency band using information within at least one other pictorial representation of the image within a second frequency band having a better resolution than the first band.

The accurate exploitation of information contained in digitized images depend on the quality of the input imaging. For analyzing multi-spectral imaging, it is particularly important that the individual spectral bands display similar spatial characteristics. This, however, is not always the situation. The Landsat-4 Thematic Mapper Satellite System, for example, collects imaging in seven separate spectral bands, ranging from the visible, through the reflective infrared to the thermal infrared portions of the electromagnetic spectrum. The ground resolution of the visible and reflective infrared images are typically about $30 \times 30$ meters, whereas, the ground resolution of the thermal infrared image is approximately $120 \times 120$ meters. The thermal infrared image is often not used because of its poorer resolution.

An image sensor of the SPOT Image Satellite will collect imaging data in four spectral bands, including panchromatic, visible and infrared frequency bands. The wideband panchromatic band will exhibit approximately $10 \times 10$ meter ground resolution, whereas the visible and infrared bands have only approximately $20 \times 20$ meter ground resolution. All of the SPOT multi-spectral data are usually processed at the poorer $20 \times 20$ meter resolution.

In television signal transmission under the NTSC system, the standard red, green and blue signals are encoded as the Y signal (back and white intensity signal), and the I and Q signals (containing the color information). Typically, bandwidth is lost in the process of encoding the signals, so that the Y signal tends to provide better resolution than the I and Q signals. Thus, a color video display receiving and decoding these signals tends to have color images of poorer resolution than the counterpart black and white images.

Prior art systems of the type described above, therefore, either discard the information contained in those images of poorer resolution, or they utilize the images of poorer resolution. It would be preferable to process all of the information at the highest resolution. This necessarily involves enhancing the resolution of the images having poorer resolution so that all images are of the same resolution.

Spatial enhancement of an image has been accomplished in many different ways. One approach has been to amplify the high spatial frequency portion of the image spectrum. This approach is normally limited to the portion of the spectrum where a high signal-to-noise ratio exists, and consequently only relatively modest gains in resolution can be achieved.

Another approach for enhancing an image employs "super-resolution" techniques. These latter techniques attempt to improve the resolution of a pictorial representation by spatial extrapolation using other prior information, such as positivity or finite extent. See, for example, Gerchberg, R. W., "Super-Resolution Through Error Energy Reduction", Optica Acta, Volume 21, No. 9, 1974, pp. 709-720.

These latter two spatial enhancement techniques yield poor results for general imaging because the phase estimation in the extrapolation spectrum is typically noisy.

The one factor that all of these image enhancement techniques have in common is that they utilize only information obtained from the pictorial representation of the image itself which accounts, in part, for its limitations.

It is, therefore, an object of the present invention to substantially reduce or overcome the problems of the prior art.

Another object of the present invention is to provide an improved system for and method of enhancing the resolution of a first pictorial representation of an image within a first frequency band using information contained within at least one other pictorial representation of the image within a second frequency band, where the second pictorial representation has a better resolution than the first pictorial representation.

And another object of the present invention is to provide an improved system for and method of enhancing the resolution of a pictorial representation of an image in one frequency band by exploiting local correlations between the pictorial representation and registered imagery of the same image in various other frequency bands, regardless of the differences in resolution of the image in each frequency band.

These and other objects are achieved by an improved system for and method of enhancing a first pictorial representation of an image within a first frequency band so as to provide an enhanced pictorial representation of the image. The system and method uses information contained within at least one other registered pictorial representation of the image within a second frequency band and having a better resolution than the first pictorial representation of said image. In accordance with the operation of the system and carrying out the steps of method of the present invention, at least one other pictorial representation of the image is modified, preferably by effectively blurring the representation to the resolution of the first pictorial representation such that local correlation information between the resulting modified pictorial representation and the first pictorial representation are determined and used to generate the enhanced version of the first pictorial representation.

Other objects of the invention will in part be obvious and will in part appear hereinafter. The invention accordingly comprises the apparatus possessing the construction, combination of elements, and arrangement of parts, and the process comprising the several steps and relation of one or more of such steps with respect to each of the others which are exemplified in the following detailed disclosure, and the scope of the application of which will be indicated in the claims.

For a fuller understanding of the nature and objects of the present invention, reference should be had to the following detailed description taken in connection with the accompanying drawings, wherein.

In the drawings, the same reference numerals are used to indicate similar or identical parts.

Figure 1:
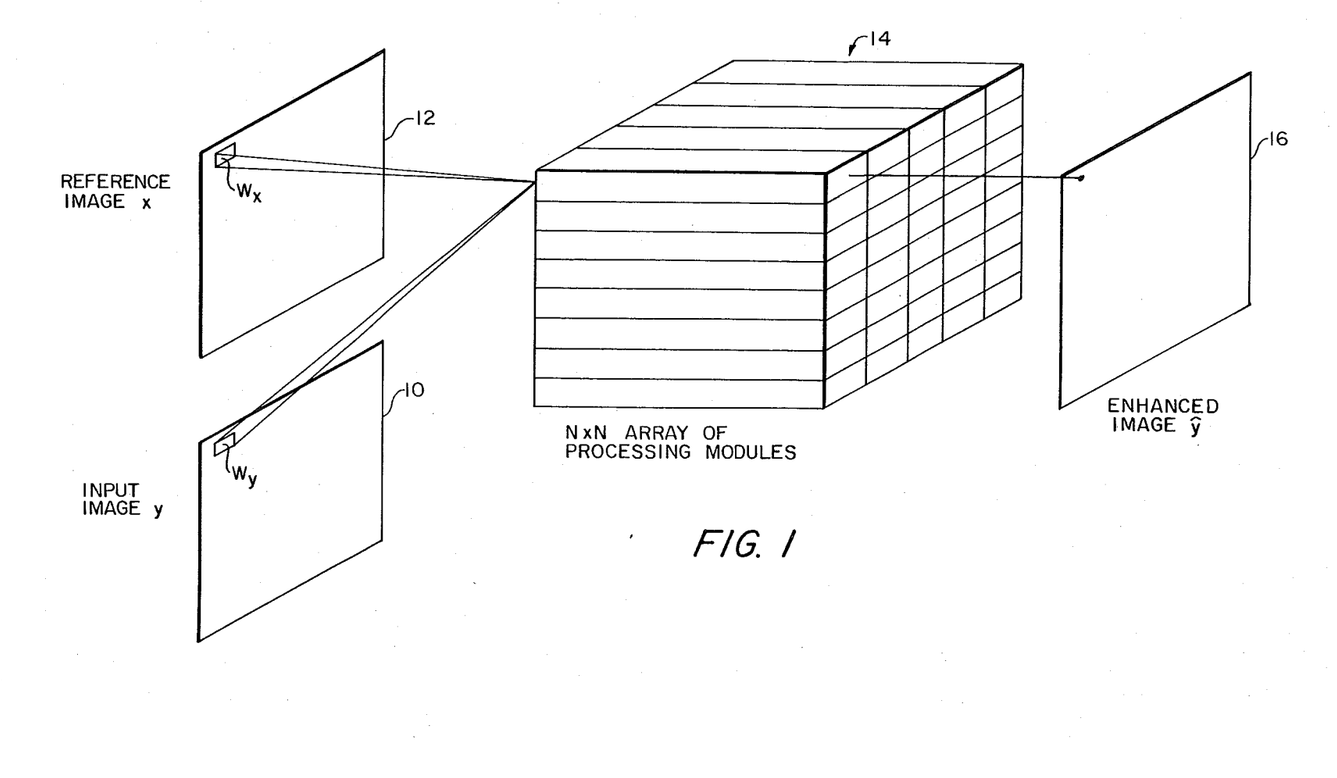
FIG. 1 is a schematic diagram illustrating the general approach of the present invention.

As shown in FIG. 1, the system 14 of the present invention is provided for acquiring the data from the pictorial representation 10 of an input image Y and the registered pictorial representation 12 of a reference image X so as to provide an enhanced pictorial representation 16 of the image $\hat{Y}$. The pictorial representation 10 of the input image Y is that of a first frequency band and generally is of poorer resolution than the registered pictorial representation 12 of the reference image X, which is that of a second frequency band. Where the images X and Y are derived, for example, from the Landsat-4 Thematic Mapper Satellite System, the pictorial representation 10 of the input image Y may be that of an image in the thermal band (band number six) of a multiband picture taken by the satellite system (i.e., between about 10.4 to 12.5 microns), while the pictorial representation 12 of the reference image X, can be any one of the other six frequency bands, i.e., bands one through five and seven, provided by this satellite system.

The pictorial representation 10 of the input image y can also be the image represented by the encoded I or Q (color) signals, while the pictorial representation 12 of the reference image X can be the image represented by the encoded Y (intensity) signal, all encoded from the red, green and blue video signals, as prescribed by the NTSC format. Typically, the encoded Y signal representing the black and white image provides an image of better resolution than either the I or Q signals.

Further, although the examples of the X and Y images are described as registered images of the same pictorial representation in different bands, the frequency bands of the two frequencies may partially or wholly overlap so long as the reference image X is of a better resolution than the input image Y. As will be more evident hereinafter, more than one reference image can be also utilized to enhance the input image Y. For example, the bands one through five and seven of the Landsat-4 Thematic Satellite Mapper, can provide six reference images X1-X6 for enhancing the image of band six.

The system 14 relies on the assumption that at sufficiently small resolutions, registered imagery data are locally (as opposed to globally) correlated across the frequency bands, or source sets. Using this local correlation property, the information in the more highly resolved reference image X can be used to predict, with a high degree of accuracy, the information in the input image Y, even though there may be poor overall or global correlation between the information of both images. Such an approach arises from the fact that edge information in a pictorial representation appears highly correlated across various frequency bands, independent of scene and time of year. For the most part, edges are manifestations of object boundaries, and occur whenever there is a change in material type. Changes in material, for example, exhibit signal changes in visible, infrared, as well as thermal infrared. Thus, edge locations in different imagery bands are virtually identical. The present invention exploits the local correlation property by utilizing an adapting window (including one or more pixels), that is small in comparison to signal variations. From a one-dimensional analysis viewpoint, the image correlations are each approximately one for the relatively constant regions and plus or minus one whenever the window overlaps an individual edge. Therefore, it is very easy to predict the behavior of an image within one frequency band from the behavior of that image in another frequency band.

Local correlation becomes more complex for the two-dimensional case. Because of the additional degree of freedom, high correlations are less likely at multiple region boundaries. Thus, if additional reference images are available (as for example, in the Landsat-4 Satellite System) a linear combination of reference bands may be necessary to construct a composite reference image locally correlated everywhere with the image of interest. Generally, the more reference bands available to construct the enhanced image, the more likely the reference bands will be able to accurately predict the information in the space defined by the local window. Generally, therefore, increasing the number of reference bands and decreasing the local window size will increase the degree of local correlation. The actual size of the window may vary. However, it has been empirically determined that good results occur in enhancing the band six image of the Landsat-4 Satellite System with a window the size of a 21×21 matrix of pixels (i.e., a matrix having five rows by five columns of pixels). Increasing the window size tends to result in the local correlations being swamped by the global correlations, while decreasing the size of the window, results in the statistics of correlation being less reliable, as well as the information being sensitive to noise.

Generally, as shown in FIG. 1, a window is provided for each pixel in the input and reference images. The system 14 acquires the information in each window $W_y$ of the input image Y, processes it with the information of the corresponding registered window $W_x$ of the reference image X to produce the enhanced image pixel point $\hat{y}$ of the enhanced image $\hat{Y}$. The position of the point $\hat{y}$ is the same address location as the center pixel of the windows $W_x$ and $W_y$. The data may be acquired, for example, directly from existing or negative images of the input and reference images, directly via a downlink, or from an intermediate storage medium, such as computer compatible magnetic tape (CCT). In the latter situation, system 14 would include a magnetic tape reader (not shown). The actual processing, as described in greater detail with respect to FIG. 2, determines the correlation between the set of information between corresponding windows $W_x$ and $W_y$. The actual correlation processing utilizes a linear prediction approach. The image estimate is formed by a weighted linear combination of one or more reference images, where the weights are recomputed for every window location over the entire image Y.

For real time processing, such as in a video system, system 14 includes a processing element for each pixel location. For a 512×512 pixel image, one requires a 256K array of processors. The correlation information for each window location can be derived in parallel operations, since the information in one window location is not dependent on the information for an adjacent window.

Once the correlation information for each pixel point $\hat{y}$ is known, each pixel value of the input image Y (at the center of the window W ) is modified as a function of the correlation information to provide the corresponding pixel point $\hat{y}$ of the enhanced image $\hat{Y}$.

The actual correlation function can best be understood by the following description.

The reference image is first blurred to the same resolution as the input image to produce blurred image $\tilde{X}$, the local window of the blurred reference image being denoted by $W_{\tilde{X}}$. By blurring the image there is a greater statistical chance that the correlation coefficients between the windowed pixels of the input image Y (within $W_y$ and blurred reference image $\tilde{X}$) is one or minus one. The relationship between the value of each group of windowed pixels $y_{ij}$ of the input image Y is related to the corresponding pixel values $\tilde{x}_{ij}$ of the blurred reference image X (wherein i and j respectively indicate the row and column position of the window) as follows:

$$\underline{y}_{ij} = c_{1ij}\underline{\tilde{x}}_{ij} + c_{0ij} \quad (1)$$

wherein the underbars denote the vectors of windowed data and $c_{0ij}$ and $c_{1ij}$ are spatial variants, i.e., vary from pixel to pixel through the entire pictorial representation.

Thus, by determining the values of $c_{0ij}$ and $c_{1ij}$ for a pixel of the enhanced image and using the corresponding values of the corresponding pixels of the reference images, the value of the pixel of the enhanced image can be determined. It can be shown that the coefficient $c_{1ij}$ in equation (1) is the correlation coefficient between the corresponding values of $\underline{y}_{ij}$ and $\underline{\tilde{x}}_{ij}$, with the value of $c_{0ij}$ being the local average adjustment.

Further, as will be more evident hereinafter, in actual practice the modelling provided by Equation (1) will not always be precise and, accordingly, Equation (1) will include an additional residual error term $\underline{e}_r$.

More specifically, the following Equation (2) represents data contained within each window $W_{\tilde{x}}$ and $W_y$ as vectors of data:

$$\begin{bmatrix} y_1 \\ y_2 \\ * \\ * \\ * \\ y_w \end{bmatrix} = \begin{bmatrix} 1 & \tilde{x}_{11} & \tilde{x}_{12} & * * * & \tilde{x}_{1p} \\ 1 & \tilde{x}_{21} & \tilde{x}_{22} & * * * & \tilde{x}_{2p} \\ * & * & * & * * * * & * \\ * & * & * & * * * * & * \\ * & * & * & * * * * & * \\ 1 & \tilde{x}_{w1} & \tilde{x}_{w2} & * * * & \tilde{x}_{wp} \end{bmatrix} \times \begin{bmatrix} c_0 \\ c_1 \\ * \\ * \\ * \\ c_p \end{bmatrix} + \begin{bmatrix} e_1 \\ e_2 \\ * \\ * \\ * \\ e_w \end{bmatrix}$$

wherein
p = the number of reference images
w = the number of data values within each window;
w > p (in practice w > p+1 so that equation (2) is overdetermined).

The system can be generalized to accommodate up to p reference images, where each column of reference data is from $W_{\tilde{x}}$ of an individual blurred reference image. The first columns of all ones corresponds to $c_0$ which is for local average adjustment.

Alternatively, as is well-known, equation (2) can be written in vector matrix form as:

$$y = Xc + e, \quad (3)$$

wherein the matrix $\tilde{X}$ contains the concatenated vectors of reference data, as well as a constant vector. There is an optimal choice (in a least-square sense) for the coefficient vector $\underline{c}$ so that the input $\underline{y}$ (windowed input) is modelled most correctly by the windowed reference images, and this can be accomplished by solving one $\underline{c}$ for the least-squares solution given by the following:

$$\underline{c} = (\tilde{X}^T \tilde{X})^{-1} (\tilde{X}^T \underline{y}), \quad (4)$$

wherein
$\tilde{X}$ is the $\tilde{X}$ matrix shown in Equation (2),
$\tilde{X}^T$ is the transposed matrix of matrix $\tilde{X}$; and
$\underline{y}$ is the vector shown in Equation (2).

In order to prevent ill-conditioning of matrix $(\tilde{X}^T\tilde{X})$, i.e., the matrix equaling zero so that $\underline{C}$ equals infinity, from adversely affecting the solution, a two fold approach is used in system 14. System 14 preferably determines the values of $\underline{C}$ efficiently for each matrix, on a line by line basis, and when an ill-conditioned matrix is encountered, a second procedure is invoked to reduce the number of unknowns to equal the rank of the matrix. The second procedure solves equation (2) by permuting the columns of the matrix $\tilde{X}$, such that $\tilde{X}$ is partitioned as $\tilde{X} = (\tilde{X}_1, \tilde{X}_2)$, wherein $\tilde{X}_1$ is w (i.e., the number of data values within each window) by $p_1$ and has a rank $p_1$. The system 14 will then determine the least-squares value, setting to zero the elements of $\underline{c}$ which correspond to $\tilde{X}_2$.

Figure 2:
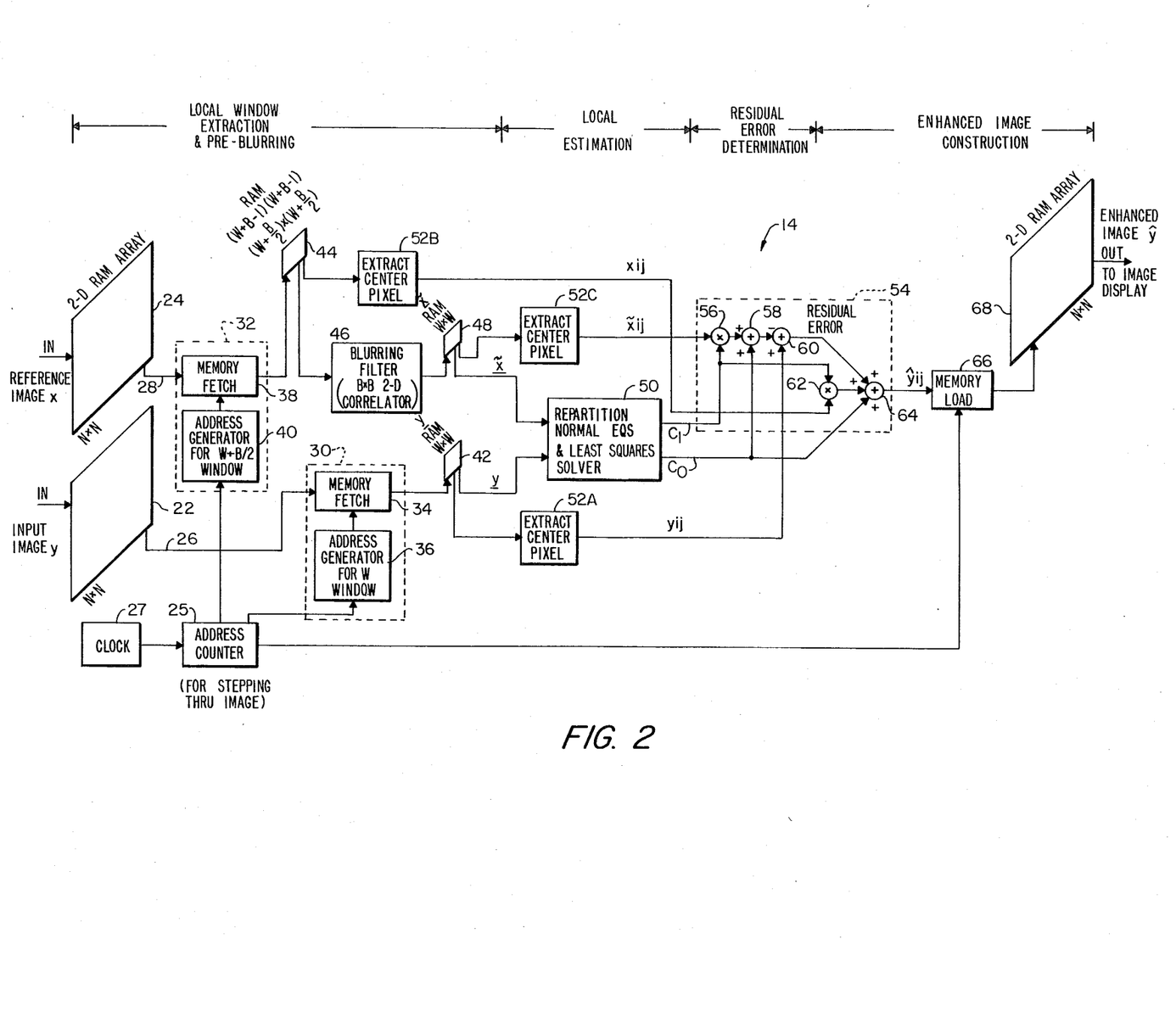
FIG. 2 is a partial schematic and partial block diagram of the preferred embodiment of the system of the present invention.

The foregoing will be more evident from the following description of FIG. 2 and its operation.

Referring to FIG. 2, the preferred system 14 includes means, in the form of at least two two-dimensional RAM (random access memory) arrays 22 and 24 for storing all of the pixel values of the input image Y and the reference image X, respectively. It will be appreciated that additional RAM arrays are respectively provided for additional reference images. The data of each image is read into the respective RAM arrays directly from the source of the data, e.g., a downlink from a satellite, or from a CCT.

A counter 25, controlled by clock 27, provides the address location of the pixel which is to be provided to the enhanced image $\tilde{Y}$.

System 14 includes means 30 for reading the data from arrays 22 representing the pixels of each window of the input image Y (defined by a matrix of pixels W×W) for the pixel identified by counter 25 and transmitting the data over line 26. System 14 also includes means 32 for simultaneously reading the data from arrays 24 representing the pixels of the corresponding window of the reference image X for the pixel identified by counter 25, plus additional pixels which are located at a predetermined number of addresses, i.e., (B−1)/2, just beyond each edge location of each window, (so as to define a matrix W+B−1×W+B−1, with the address locations of the corresponding W×W matrix disposed in the center of the W+B−1×W+B−1 matrix) and transmitting the data over line 28 for carrying out the blurring of the reference image.

More specifically, means 30 is disposed in the signal path of line 26 for addressing the array 22 at W×W addresses representing a window (with the location provided by counter 25 being located at the counter of the window) and reading out the data from these addresses over the line 26. Similarly, means 32 is disposed in the signal path of line 28 for addressing the array 24 at W+B−1×W+B−1 addresses representing the corresponding window W×W of the reference image and the additional pixel data (B−1)/2 adjacent the edges of the window W×W in the reference image. Means 30 preferably includes memory fetch device 34 which enables the RAM array 22 and reads the data at the addresses generated by address generator 36 (responsive to the address output of the counter 25) for the W×W size window. Means 32 preferably includes a similar memory fetch device 38 and address generator 40 for reading the data of W+B−1 window of the reference image X from RAM array 24. Each memory fetch device and corresponding address generator can be any type of device for addressing and reading the respective data. For example, a ROM (not shown) programmed according to the program attached as Appendix A, capable of sequencing through the address locations of the RAM array to define the window in response to an address signal provided from counter 25, can be read out onto the respective line 26 and 28. The ROM, preferably, would sequentially read the pixel values of each window (and the appropriate additional values represented by the term B−1) on a line by line basis.

A second pair of RAM arrays 42 and 44 are provided for storing each set of values of the respective W×W window output of means 30 and the W+B−1×W+B−1 window output of means 32. The additional data provided in the RAM array 44 is needed to blur the window data represented by the W×W matrix of pixel data centered in the W+B−1×W+B−1 window of the reference image. In this regard, the value of B<W, W is empirically determined. For example, for Landsat-4 Satellite images, W=21 for best results. In order to effectively reduce the reference image ground resolution of 30 meters to the input image ground resolution of 120 meters, B should equal 5.

The output of the RAM array 44 is connected to means for modifying the W+B−1×W+B−1 window data so as to provide a new set of data W×W representing the blurred image of the window of the reference image X which is blurred to be at the same resolution as the corresponding image of the W×W window of the input image Y. The means includes the blurring filter 46, adapted to provide a convolution or blur within the size of the window of data. This is equivalent to a two-dimensional low pass filter.

In the example above, the B×B convolving matrix, or blur kernel, is chosen to provide a 5×5 convolution function and can be generated, for example, in accordance with the steps shown in Appendix B. The function, for example, may be any one of several functions, such as an averaging function, a Gaussian function or an Airy function. Filter 46 centers the blur kernel onto the image provided by the first set of values from the W+B−1×W+B−1 matrix stored in array 44, and clocked into the filter 46. Thus, in the case of a 5×5 averaging kernel and a local analysis window of 21×21 the kernel is imposed on a 5×5 matrix within the 25×25 (W+B−1×W+B−1) matrix. The twenty-five values of the kernel are multiplied point by point, with twenty-five values of the 5×5 matrix of the W+B−1×W+B−1 matrix. The twenty-five resulting values are summed together and averaged so as to provide the value of a center pixel of portion of the 5×5 matrix within W+B−1×W+B−1 window upon which the B×B function is centered. This value of the center pixel is used as the pixel value at the center location of the blurred reference image and is stored in the RAM array 48 connected to the output of filter 46. Filter 46 slides one row or column within the W+B−1×W+B−1 matrix and repeats the convolution step to provide another pixel value of the blurred reference image. The procedure is repeated for all the B×B center pixel matrix values within the W+B−1×W+B−1 matrix stored in the RAM array 44 so as to provide the W×W matrix of pixel values of the window of the blurred reference image. This blurring procedure is also classically known as a discrete two-dimensional convolution of an FIR (finite impulse response) filter (which is the blur kernel) with an image array. In the present case, the FIR filter is a low pass filter. Filter 46 may be any type of device for carrying out the functions described. For example, a correlator including ROM programmed in accordance with the program attached as Appendix C, shift registers for holding the values of the B×B matrix provided from the RAM array 44 and upon which the blur kernel is centered, a storage device for storing the values of the blurring kernel, a shift register for holding the values of the blurring kernel, an arithmetic logic unit for multiplying the values in the two registers, and an accumulator for providing the average value of the solution to the convolution function. Means are also provided for sequencing the address locations of the RAM array 44, such as a set of counters which, together with the other components of the filter 46, can be appropriately clocked in response to the clocking output of clock 42. The output values of filter 46, the W×W pixel values of the blurred image X, are stored in the RAM array 48.

Each value of the W×W matrices stored in RAM arrays 42 and 48 are fed to the two inputs of the normal equation partitioner and least squares solver 50. The latter is adapted to solve Equation (2) and generate the coefficient $c_0$ and $c_1$. Further, if ill-conditioning (of the matrix $X^T X$) occurs then the solver 50 first reorders the system of equations and sets the coefficients to zero which corresponds to the redundant equations. Solver 50 may be any type of device for carrying out these functions. For example, solver 50 may be a microprocessor programmed with commercially available programs for equating the number of unknown coefficients with rank of the matrix and for generating the solutions for $c_0$ and $c_1$. For example, one commercially available program for reducing the redundancies of a least squares problem and for generating the values of $c_0$ and $c_1$, $c_2$ . . . $c_p$ is the IMSL Fortran Subroutine LLBQF sold by International Mathematical and Statistical Libraries, Inc. Alternatively, solver 50 may be a systolic array, programmed for carrying out the functions required.

To the extent described, the modelling used to generate the solutions $c_0$ and $c_1$ is not perfect. Accordingly, it is desirable to generate the residual error, i.e., that portion of the data which cannot be modelled by the system, and add it to the final value of the pixel value of enhanced image $\hat{y}$.

More particularly, Equation (1) becomes:

$$y_{ij} = c_{0ij}\hat{x} + c_{1ij} + e_r \tag{5}$$

wherein $e_r$ is the added residual error calculated for the center pixel of the W×W matrix which is the pixel location (row i, column j) whose value is being generated by the system.

Thus, $$e_r = y_{ij} - (c_{0ij} + c_{1ij}\hat{x}_{ij}) \tag{6}$$

wherein $y_{ij}$ is the center pixel value of the matrix stored in RAM array 42 (located at row i, column j);

$c_{0ij}$ and $c_{1ij}$ are the coefficients generated from solver 50 for the pixel (located at row i, column j) ; and $x_{ij}$ is the center pixel value of the matrix stored in RAM array 48.

The means for generating each of the values of $y_{ij}$ from Equation (5) includes means 52 for generating the center pixel values from the matrix values stored in RAM arrays 42, 44 and 48, and means, generally indicated at 56, for generating the solution to Equations (5) and (6).

The means 52A, 52B and 52C for respectively generating the center pixel values of the W×W matrix stored in RAM array 42 (the input image), the W+B−1×W+B−1 matrix stored in the RAM array 44 (the enlarged reference image window) and the W×W matrix stored in the RAM array 48 (the blurred reference image) each, for example, may be a sample and hold circuit, enabled when the center address signal of the corresponding RAM array is addressed and read out of the respective array.

The means 54 for generating the solutions to Equations (5) and (6) may be in the form of digital signal adders, subtractors and multipliers. More specifically, multiplier 56 is connected to multiply the center pixel value $\tilde{x}_{ij}$ from circuit 52C and the value of $c_{lij}$ provided at the output of solver 50 to provide the signal product $c_{lij}\tilde{x}_{ij}$. Adder 58 adds the $c_{lij}\tilde{x}_{ij}$ signal to the $c_{0ij}$ signal output of the solver 50 so as to produce the sum signal $c_{lij}\tilde{x}_{ij} + c_{0ij}$. The sum signal is subtracted from the $y_{ij}$ signal by the signal subtractor 60 so as to generate the residual error signal $e_r$ for the $y_{ij}$ pixel, and, therefore, the solution to Equation (6). The multiplier 62 is connected to multiply the value of $c_{lij}$ generated by sample and hold circuit 52B to produce the product signal $c_{lij}x_{ij}$. Finally, signal adder 64 provides the sum of the residual error signal $e_r$ signal from adder 64, the product signal $c_{lij}x_{ij}$ from multiplier 62 and the value of $c_{0ij}$ generated from solver 50 to provide the output signal $\hat{y}_{ij}$, the solution to Equation (6).

The output of summer 64 is provided to the memory load device 66, the latter writing the output into the appropriate memory location of the two-dimensional RAM array 68 at the location addressed by counter 25.

It should be appreciated that all of the components are appropriately clocked to insure that the value of $\hat{y}_{ij}$ at the output of summer 64 is stored at the appropriate ij location in RAM array 68.

Figure 3A:
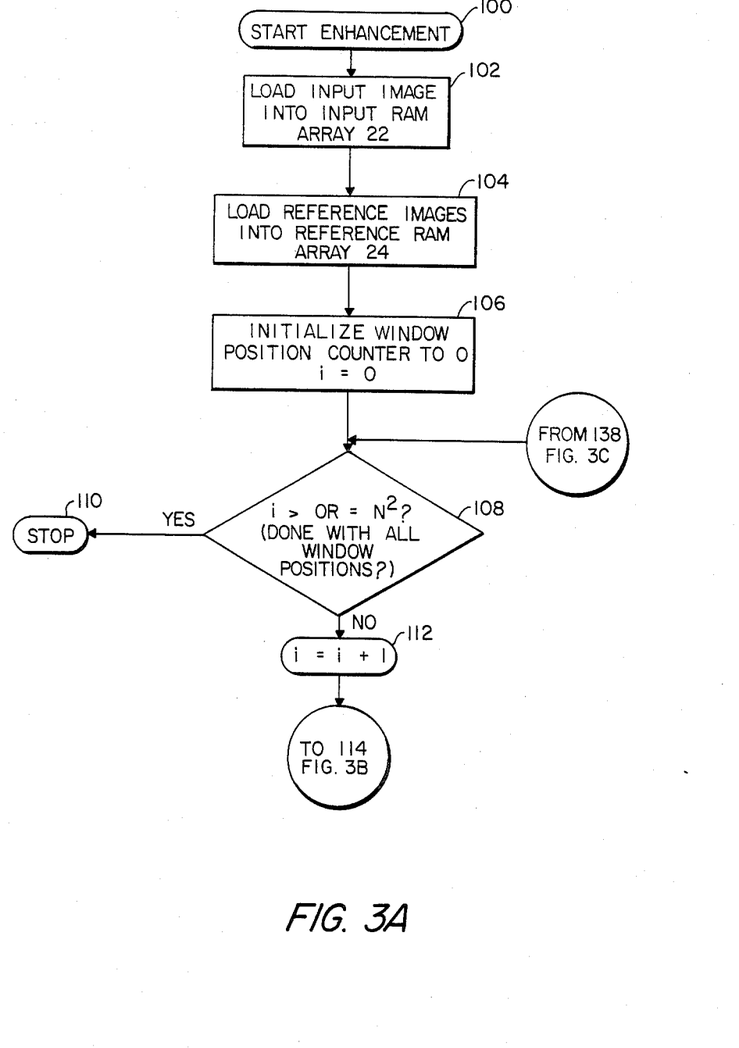
FIGS. 3A-3C are a flow charts for use in describing the operation of FIG. 2.

Referring to FIG. 3A, the operation of the system 14 of FIG. 2 is illustrated by the flow chart. The system is externally initiated at 100 by the operator. This results in input data of input image Y being fed into the RAM array 22 and the input data of the reference image X being fed into the RAM array 24, as illustrated at 102 and 104. The size of each array is NxN. The input data is provided, for example, from a computer tape (CCT). The address counter 25 and address generators 36 and 40 are next set to zero as indicated at 106, so that the window position is set to zero. The operation proceeds to step 108, where the value of the window position i is tested to see whether or not it is greater than or equal to $N^2$. If i is greater than or equal to $N^2$, then the operation has proceeded through all of the window positions and the operation stops at 110. If not, the address counters increment one, $i = i+1$, so that the next window address is provided (it being assumed that the 2-D array can be linearly ordered).

Figure 3B:
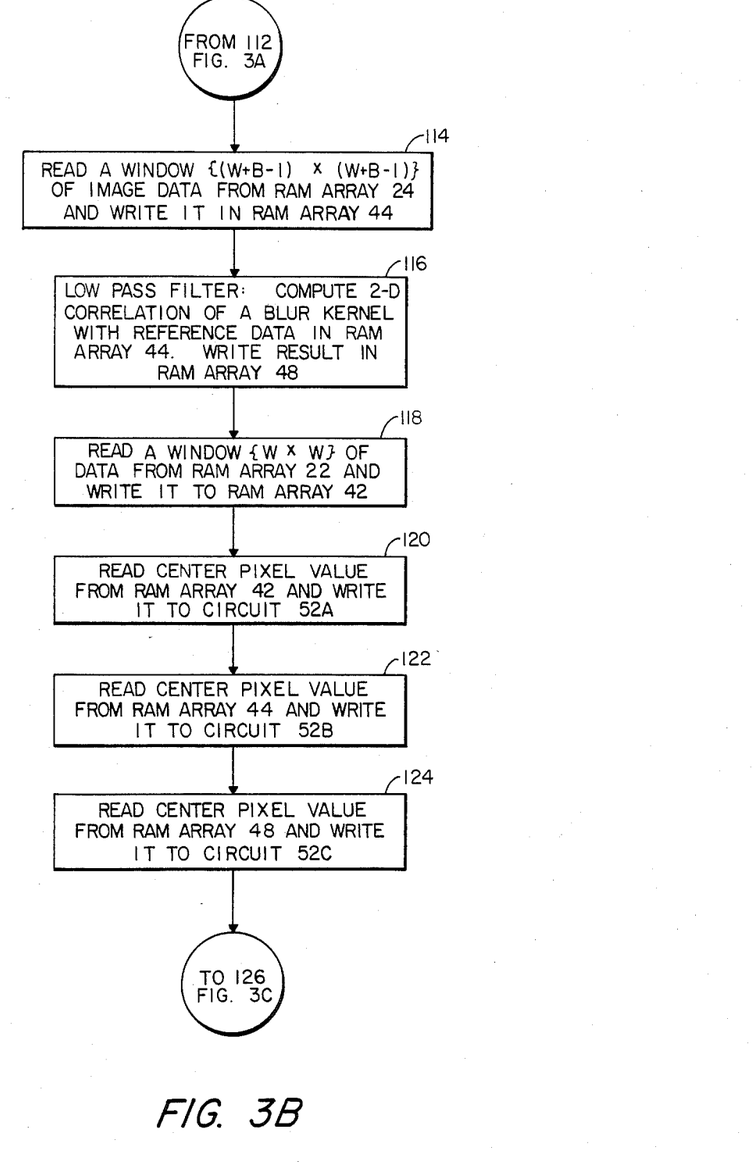

The operation proceeds to 114 in FIG. 3B, where the memory fetch devices 34 and 38, respectively, read a window of data W+B−1×W+B−1 from the RAM array 24 and respectively write the data in the corresponding RAM array 44. At 116, the data in RAM array 44 is read out to the filter 46 so that the two-dimensional convolution of the blur kernel with the reference data from RAM array 44 is determined with the blurred reference image being written into RAM array 48. The window data of the input image in RAM array 22 is next written into RAM array 42 by the memory fetch 34, as indicated at 118. The center pixel values of the window data stored in the respective RAM arrays 42, 44 and 48 can now be written into and latched by the circuits 52A, 52B and 52C, as shown at 120, 122 and 124.

Figure 3C:
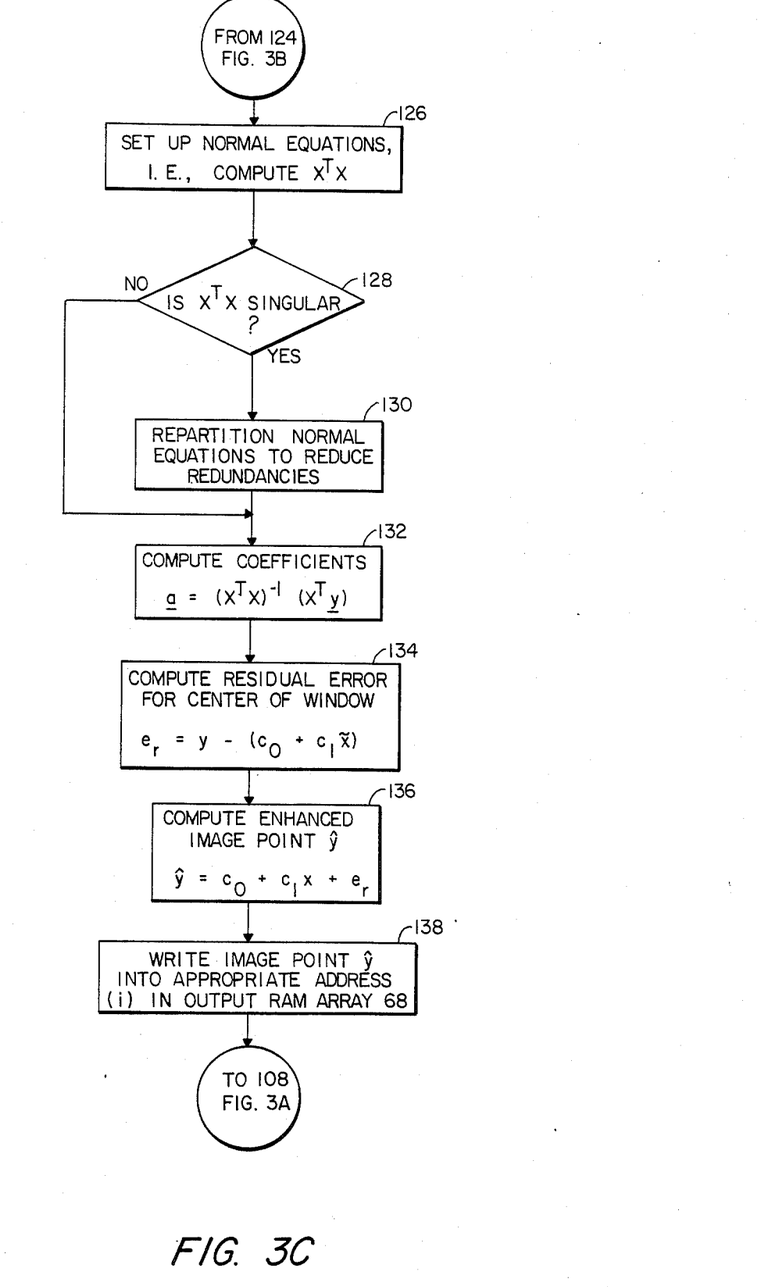

The operation proceeds to step 126 shown in FIG. 3C, wherein the information in arrays 42 and 48 are transmitted to the solver 50 wherein the values of $\tilde{X}^T\tilde{X}$ are computed as indicated at 126. Each value of $\tilde{X}^T\tilde{X}$ is tested at step 128 to determine whether it is singular, i.e., a diagonal element equal to zero, and if so, repartition the normal equations so that the number of unknown coefficients is equal to the rank of $\tilde{X}^T\tilde{X}$. In doing so, the coefficients corresponding to the redundant equations are set to zero, as indicated at 130. The operation proceeds to step 132 wherein the coefficients for $\underline{c}$ are computed. The values of $c_1$ and $c_0$ and the outputs of circuits 52A, 52B and 52C are used to provide the residual error $e_r$, as indicated at 134. The output of adder 64 will then provide the enhanced image point value of $\hat{y}$.

The image point $\hat{y}$ is then written by memory load 66 into the appropriate adder (i) location, indicated by counter 25, into the RAM array 68. The operation then proceeds to step 108 and repeats until i is greater than or equal to $N^2$.

Figure 4:
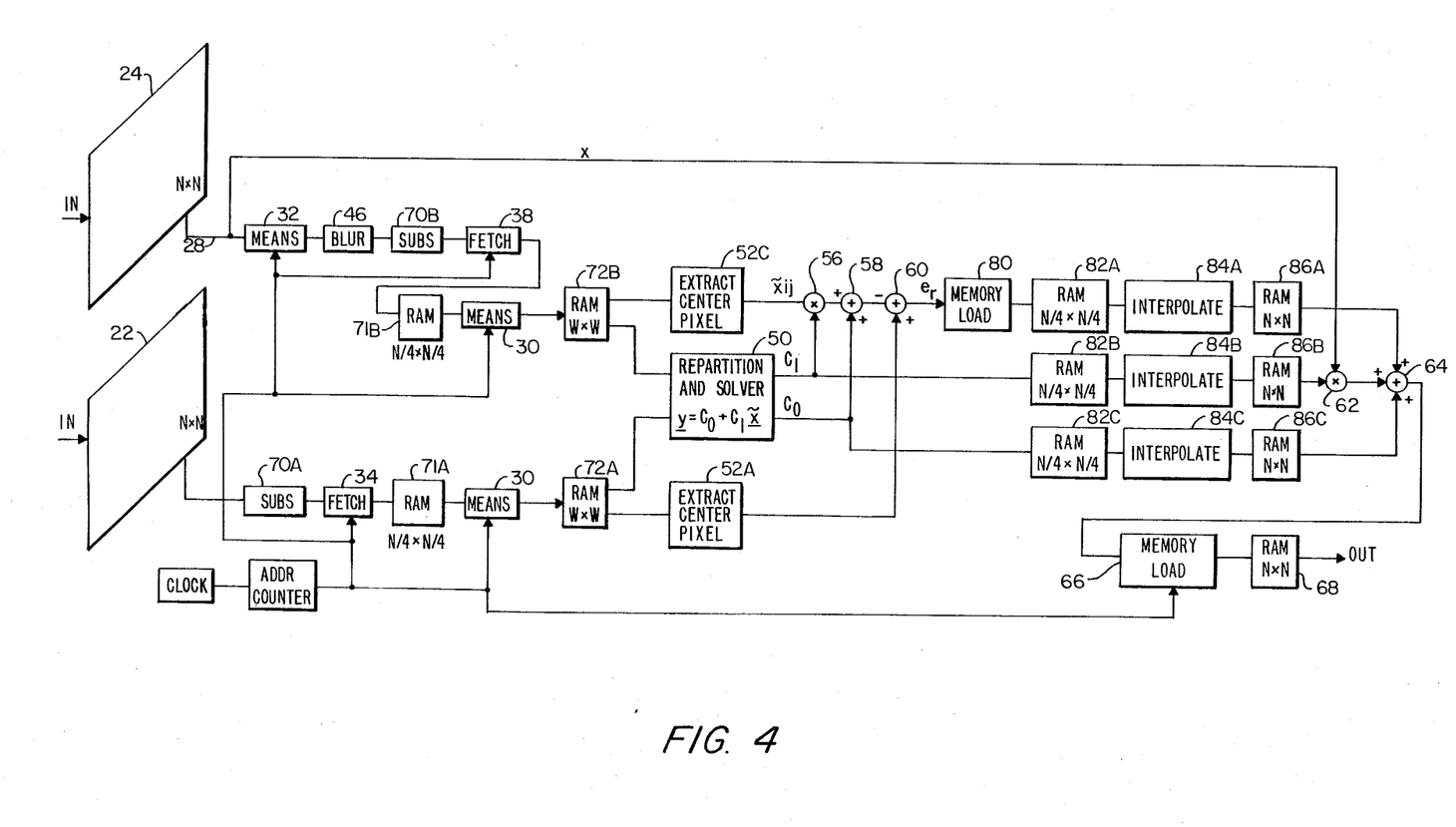
FIG. 4 is a partial schematic and partial block diagram of an alternative embodiment of the system of the present invention.

The FIG. 2 embodiment can be modified to reduce the computational time necessary for the solver 50. For example, as shown in FIG. 4, the means 32 can be connected directly to the blurring filter 48. The output of the blurring filter 48 and the output line 26 of the RAM array 22 are connected to subsampler circuits 70A and 70B, respectively, each, for example, being a sample and hold circuit for providing at its output every nth sample signal provided at its input. Thus, for example, the subsampler circuits may provide every 4th signal provided at its input.

The outputs of subsampler circuits 70A and 70B are each connected to RAM arrays 71A and 71B, respectively. The outputs of the RAM arrays 71A and 71B are addressed by the window generation system 30 and provide windows of data to RAM arrays 72A and 72B, respectively. RAM array 72A provides an output to the sample and hold circuit 52C and the $\underline{\tilde{x}}$ input of the solver 50. RAM array 72B provides an output to the sample and hold circuit 52A and $\underline{y}$ input to the solver 50.

After generating the values of $c_{lij}$, $c_{0ij}$, the individual values of $e_r$ can also be calculated in the same manner as in FIG. 2. Each value of $e_r$ is applied to a memory load circuit 80. The output of circuit 80 and the individual values of $c_{lij}$ and $c_{0ij}$ are respectively entered into the RAM arrays 82A, 82B and 82C. The signal outputs of arrays 82A, 82B and 82C each respectively are applied to the input of an interpolar circuits 84A, 84B and 84C for providing the additional three samples between each pair of output samples of the arrays 82A, 82B and 82C to make up for the three samples dropped by the subsampler circuits 76.

Each interpolar circuit 84 preferably provides the interpolated data in accordance with a two-dimensional bilinear interpolation approach, wherein each interpolated value within the matrix output of the interpolation circuit is a weighted average as a function of the distance within the matrix (of the output value) from the values provided at the interpolated input of the circuit. Thus, for example, if the values provided at the input of the interpolation circuit are located at the $x_{11}$, $x_{13}$, $x_{31}$ and $x_{33}$ locations of a 3×3 matrix, the interpolated value of $x_{12}$ will be the weighted average of $x_{11}$ and $x_{13}$, the interpolated value of $x_{21}$ will be the weighted average of $x_{11}$ and $x_{31}$, the interpolated value of $x_{32}$ will be the weighted average of $x_{31}$ and $x_{33}$, the value of $x_{22}$ will be the weighted average of $x_{11}$, $x_{13}$, $x_{31}$ and $x_{33}$, and so forth.

The outputs of arrays 82A, 82B, 82C, 24 are then combined with digital multipliers 62 and adders 64 to form the enhanced image, on a pixel by pixel basis synchronized by the address counter 25. More specificaly, multiplier 62 is connected to provide $c_{lij}x_{ij}$ and adder 64 provides $c_{0ij} + c_{lij}x_{ij} + e_{rij}$. The output of summer 64 is loaded into the appropriate memory location in RAM 68 by the memory load device 66.

Each interpolator circuit 82 may be any type of microprocessor circuit capable of carrying out the program shown in Appendix D for carrying out the two-dimensional bilinear interpolation.

The foregoing thus provides an improved system and method of enhancing the pictorial representation of an image in one frequency band using the multi-band local correlation information in one or more pictorial representations of the image in other frequencies bands.

Since certain changes may be made in the above apparatus without departing from the scope of the invention herein involved, it is intended that all matter contained in the above description or shown in the accompanying drawings shall be interpreted in an illustrative and not in a limiting sense.

---

Program for generating window addresses and
for reading data from input image arrays Y (N×N)
to window array. Wy (W×W). Window center is at i.
(it is assumed that 2-D arrays can be linearly addressed)

```
int WY[W*W], Y[N*N]
int istart, i, k, W2, W, N, in:
istart = i - (N*(W-1)/2 + (W-1)/2);
in = istart - 1;
k = 0;
for  (i = 0; i < (W*W); i++) {
        k = k+1;
        if k > W {
        k = 1;
        in = in+N-W+1;
        }
        if k <= W {
        in = in+1;
        }
        WY[i] = Y[in];
}
```

---

Program for generating a Gaussian blur kernel (B×B) h(n,m)

```
float rx, ry, s;
S = B*B/8.;
for (n = 0; n < B; n++) {
    for (m = 0; m < B; m++) {
        rx = (n - ((B-1)/2.))*(n - ((B-1)/2.));
        ry = (m - ((B-1)/2.))*(m - ((B-1)/2.));
        h(n,m) = exp(- (rx+ry)/s);
    }
}
```

---

Program for convolving an input image X(n,m)
$\{(W+B-1) \times (W+B-1)\}$
with a symetric blur function h(n,m) {B×B} to
yield a blurred output image $\tilde{x}(n,m)$ {W×W}

```
int n,m,k,l;
for (n = 0; n < W; n++) {
    for (m = 0; m < W; m++) {
        x̃(n,m) = 0;
        for (k = 0; k < B; k++) {
            for (l = 0; l < B; l++) {
                x̃(n,m) = x̃(n,m) + x(n+k, m+l)h(k,l);
            }
        }
    }
}
```

---

```
/*
 * Do bilinear interpolation for a resampled image.
 */
int interpb (iir, ibuf, xbuf, ybuf, xnext, ynext, interpct)
rect *iir;              /* interpolation input rect */
float *ibuf;            /* input data buffer */
float *xbuf;            /* buffer for x coords */
float *ybuf;            /* buffer for y coords */
double *xnext;          /* next x coord returned */
double *ynext;          /* next y coord returned */
int *interpct;          /* interp count returned */
{                       /* {INTERPB */
    int ict;
    int oct;
    double ix,iy;
    double ixmin,ixmax,iymin,iymax;
    double inppl;
    double xdo,ydo;
    double xfracl,xfracr,yfrac;
    double outval;
    float *ip;
    int first;
/*
 * Set up for loop.
 */
    ixmin = iir->r_xl;
    ixmax = iir->r_xr + 1;
    iymin = iir->r_yt;
    iymax = iir->r_yb + 1;
    xdo = iir->r_xl;
    ydo = iir->r_yt;
    inppl = iir->r_xr - iir->r_xl + 2.0;
    first = TRUE;
    ict = *interpct;
    oct = ict;
/*
 * Now loop.
 */
    while ( oct && ict )
    {                       /*{output pixel loop */
        ix = *xbuf;
        iy = *ybuf;
        if ( ix >= 0.0 )
        {                   /* {a pt yet to be interp'd */
            /* check for within limits of input data */
            if ((ix >=ixmin) && (ix < ixmax) &&
                (iy >=iymin) && (iy >iymax))
            {
                /* store output point, set done flag,
                 * update interpct
                 */
                xfracr = modf(ix,&ix);
                xfracl = 1.0 - xfracr;
                yfrac = modf(iy,&iy);
                ix -= xdo;
                iy -= ydo;
                ip = ibuf + ((int) (iy = inppl + ix));
                outval = (1.0 - yfrac) *
                    (xfracl * (*ip) + xfracr * (*(ip+1)));
                ip += (int) inppl;
                outval +=. yfrac *
                    (xfracl * (*ip) + xfracr * (*(ip+1)));
                *ybuf = outval;
```

-continued

```
            *xbuf = -1.0;
            ict--;
        }
        else
        {
            if ( first )
            {
                *xnext = ix;
                *ynext = iy;
                first = FALSE;
            }
        }
        oct--;
    }            /* }a pt yet to be interp'd */
    xbuf++;
    ybuf++;
}                /* }output pixel loop */
/*
 * Set return values and return.
 */
    *interpct = ict;
    return;
}                /* }INTERB */
```

What is claimed is:

1. A system for enhancing a first pictorial representation of am image within a first frequency band so as to provide an enhanced pictorial representation of said image using information contained within at least a second pictorial representation of said image within a second frequency band, wherein said second pictorial representation of said image has a better resolution than said first pictorial representation of said image, said system comprising:

means for generating a first plurality of signals as a function of a first set of pictorial segments of said first pictorial representation, wherein each of said first pictorial segments comprises at least one component part;

means for generating a second plurality of signals as a function of a second set of pictorial segments of said second pictorial representation, said second set of pictorial segments spatially corresponding with respect to said image to said first set of pictorial segments;

means, responsive to said first and second plurality of signals, for generating a third plurality of signals as a function of respective correlation information associated with and between each of said pictorial segments of said first set of pictorial segments and the corresponding pictorial segment of said second set of pictorial segments;

means, responsive to said first and third plurality of signals, for generating a fourth plurality of signals as a function of a pictorial component part of each pictorial segment of a third set of pictorial segments representative of said enhanced pictorial representation, wherein the pictorial segments of said third set spatially correspond with respect to said image to the pictorial segments of said first set, and each of said pictorial component parts of each of said pictorial segments of said first pictorial representation is modified as a function of the respective correlation information associated with that pictorial segment so as to provide each corresponding pictorial component part of said enhanced pictorial representation; and means for combining said fourth plurality of signals so as to produce said enhanced pictorial representation.

2. A system according to claim 1, wherein said means for generating said third plurality of signals includes means for modifying said second plurality of signals so as to effectively blur the pictorial segments of said second pictorial representation to substantially the same resolution as the resolution of the corresponding pictorial segments of said first prictorial representation and provide a modified second pictorial representation of said image represented by the blurred pictorial segments.

3. A system according to claim 2, wherein said means for modifying said second plurality of signals includes means for convolving said second plurality of signals.

4. A system according to claim 3, wherein said means for convolving said second plurality of signals includes means for generating a fifth plurality of signals representative of a convolution kernel and convolving said second plurality of signals with said fifth plurality of signals.

5. A system according to claim 4, wherein said convolution kernel is an averaging function.

6. A system according to claim 4, wherein said convolution kernel is a Gaussian function.

7. A system according to claim 4, wherein said convolution kernel is an Airy function.

8. A system according to claim 1, wherein said means for generating said first plurality of signals and said means for generating said second plurality of signals each respectively generate said plurality of signals such that each of the corresponding pictorial segments of said first and second pictorial representations is defined by a matrix arrangement of a plurality of pixels of the respective pictorial representation of the image, and each pictorial segment of said first and second pictorial representations includes a pictorial component, each pictorial component part being a pixel of said matrix arrangement and spatially corresponding with respect to said image to the respective pictorial component part of the first set of pictorial segments represented by said first plurality of signals.

9. A system according to claim 8, wherein each of said pictorial component parts is the center pixel of said matrix arrangement of a corresponding segment of said first set of said pictorial segments.

10. A system according to claim 2, wherein said means for modifying said second plurality of signals include means for generating a fifth plurality of signals as a function of said blurred pictorial segments of said modified second pictorial representation, said first plurality of signals are a function of a windowed vector $W_y$, said windowed vector $W_y$ being a function of a matrix arrangement y of pixels of each pictorial segment of the first pictorial representation, said fifth plurality of signals are a function of a windowed vecctor $W_{\tilde{x}}$, said windowed vector $W_{\tilde{x}}$ being a function of a matrix arrangement $\tilde{X}$ of pixels of each of the pictorial segments of said modified second pictorial representation spatially corresponding with respect to said image to a respective matrix arrangement $Y$ of pixels of the first pictorial representation, and said third plurality of signals are generated as a function of a matrix produce $(\tilde{X}^T\tilde{X})^{-1}(\tilde{X}y)$.

11. A system according to claim 10, wherein the matrix product $(\tilde{X}^T\tilde{X})^{-1}(\tilde{X}y)$ is a correlation coefficient between the windowed vectors $W_y$ and $W_x$ around the center pixel of each matrix arrangement of pixels of corresponding pictorial segments of the first and modified second pictorial representations.

12. A system according to claim 11, wherein said means for generating said fourth plurality of signals generates said fourth plurality of signals as a function of each center pixel of each corresponding matrix arrangement of the pixels of each pictorial segment of the first pictorial representation as modified by the corresponding correlation coefficient.

13. A system according to claim 12, wherein the value of the center pixel of each pictorial segment of the enhanced pictorial representation is respectively related to the correspondig center pixel of a corresponding blurred pictorial segment of the modified second pictorial representation as follows:

$$\hat{y} = c_1 \tilde{x} + c_0 + e_r$$

wherein y designates the particular pictorial segment of the enhanced pictorial representation;

$c_1$ is the correlation coefficient;

$\tilde{x}$ is the corresponding blurred pictorial segment of the modified second pictorial representation;

$c_0$ is the coefficient for the pictorial segment of the second pictorial representation; and $e_r$ is the residual error representative of data variations that cannot be modelled by said means for generating said third plurality of signals.

14. A system according to claim 1, further including subsampling means for subsampling said first and second plurality of signals, wherein said means for generating said fourth plurality of signals includes means responsive to said first and third plurality of signals for interpolating information within said enhanced pictorial representation missing from said enhanced pictorial representation as a result of subsampling of said first and second plurality of signals by said subsampling means.

15. A method of enhancing a first pictorial representation of an image within a first frequency band so as to provide an enhanced pictorial representation of said image using information contained within at least one other reference pictorial representation of said image within a second frequency band, wherein said at least one other pictorial representation of said image has a better resolution than said first pictorial representation of said image, said method comprising the steps of:

blurring the reference pictorial representation to provide a blurred pictorial representation of the image of substantially the same resolution as said first pictorial representation;

determining the local correlation information between pictorial segments of the first pictorial representation of said image and corresponding pictorial segments of the blurred pictorial representation; and modifying each pictorial component defined as a function of each of said pictorial segments of the first pictorial representation as a function of said local correlation information so as to produce an enhanced pictorial representation of the image.

16. A method according to claim 15, wherein the step of blurring said reference pictorial representation includes convolving each of the pictorial segments of the reference pictorial representation with a blur kernel.

17. A method according to claim 16, wherein each of said pictorial segments is a matrix of pixels and each of said pictorial components is a center pixel within each corresponding matrix, and said step of determining the local correlation information between pictorial segments of said first and blurred pictorial representation includes the step of determining a correlation coefficient between a windowed vector around the center pixel of each matrix of pixels of the first pictorial representation, and a corresponding window vector around the corresponding center pixel of the corresponding matrix of the blurred pictorial representation.

18. A method according to claim 17, wherein said step of modifying each component includes modifying said each component as a function of said local correlation information and residual error information which cannot be modelled and derived as a part of said local correlation information.

19. A method according to claim 15, further including the steps of subsampling information relating to the pictorial segments of said first and second pictorial representations of said image prior to determining the local correlation information, and interpolating said information after said determination step.

* * * * *

UNITED STATES PATENT AND TRADEMARK OFFICE
CERTIFICATE OF CORRECTION

PATENT NO. : 4,683,496

DATED : July 28, 1987

INVENTOR(S) : Victor Tom

It is certified that error appears in the above-identified patent and that said Letters Patent is hereby corrected as shown below:

Claim 1, column 13, line 25, delete "am" and insert -- an --,

Claim 10, column 14, line 52, delete "y" and insert -- $\underline{y}$ --;

Claim 10, column 14, line 54, delete "vecctor" and insert -- vector --;

Claim 10, column 14, line 61, delete "produce" and insert -- product --;

Claim 13, column 15, line 11, delete "correspondig" and insert -- corresponding --;

Claim 13, column 15, line 18, delete "y" and insert -- $\hat{y}$ --;

Claim 17, column 16, line 26, delete "representation" and insert -- representations --;

Claim 19, column 16, line 41, delete "second" and insert -- blurred --; and

UNITED STATES PATENT AND TRADEMARK OFFICE
CERTIFICATE OF CORRECTION

PATENT NO. : 4,683,496

DATED : July 28, 1987

INVENTOR(S) : Victor Tom

It is certified that error appears in the above-identified patent and that said Letters Patent is hereby corrected as shown below:

Claim 2, column 14, line 7, delete "prictorial" and insert --pictorial--.

Signed and Sealed this

First Day of December, 1987

Attest:

DONALD J. QUIGG

*Attesting Officer*  *Commissioner of Patents and Trademarks*